(12) United States Patent
Palumbo et al.

(10) Patent No.: US 8,025,979 B2
(45) Date of Patent: *Sep. 27, 2011

(54) STRONG, LIGHTWEIGHT ARTICLE CONTAINING A FINE-GRAINED METALLIC LAYER

(75) Inventors: Gino Palumbo, Toronto (CA); Iain Brooks, Toronto (CA); Konstantinos Panagiotopoulos, Toronto (CA); Klaus Tomantschger, Mississauga (CA); Jonathan McCrea, Toronto (CA); Dave Limoges, Etobicoke (CA); Uwe Erb, Toronto (CA)

(73) Assignee: Integran Technologies Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,977

(22) Filed: Aug. 12, 2010

(65) Prior Publication Data
US 2011/0003171 A1  Jan. 6, 2011

Related U.S. Application Data

(63) Continuation of application No. 12/536,821, filed on Aug. 6, 2009, now Pat. No. 7,803,072, which is a continuation of application No. 12/000,582, filed on Dec. 14, 2007, now Pat. No. 7,591,745, which is a continuation of application No. 11/013,456, filed on Dec. 17, 2004, now Pat. No. 7,387,578.

(51) Int. Cl.
*B22F 7/02* (2006.01)
*A63B 59/06* (2006.01)
*A63B 53/12* (2006.01)

(52) U.S. Cl. ......... 428/548; 473/564; 473/316; 428/336

(58) Field of Classification Search .......... 473/316–323, 473/457, 519, 520, 564–568; 205/50, 67, 205/73, 80, 164, 255, 261, 271; 427/22, 230, 123; 428/34.1, 332, 433, 336, 432, 457, 458, 546, 548, 615, 656

See application file for complete search history.

(56) References Cited

U.S. PATENT DOCUMENTS

| | | |
|---|---|---|
| 3,061,525 A | 10/1962 | Grazen |
| 3,949,988 A | 4/1976 | Stauffer |
| 4,113,248 A | 9/1978 | Yanagioka |
| 4,124,208 A | 11/1978 | Burns |
| 4,188,032 A | 2/1980 | Yanagioka |
| 4,279,707 A | 7/1981 | Anderson et al. |
| 4,461,680 A | 7/1984 | Lashmore |
| 4,556,607 A | 12/1985 | Sastri |
| 4,951,953 A | 8/1990 | Kim |
| 5,207,427 A | 5/1993 | Saeki |

(Continued)

FOREIGN PATENT DOCUMENTS

EP  0341643  11/1989

(Continued)

*Primary Examiner* — Mark Graham
(74) *Attorney, Agent, or Firm* — Bacon & Thomas, PLLC (57) ABSTRACT

Articles for automotive, manufacturing and industrial applications including shafts or tubes used, for example, as golf club shafts, ski and hiking poles, fishing rods or bicycle frames, skate blades and snowboards are at least partially electroplated with fine-grained layers of selected metallic materials. Parts with complex geometry can be coated as well. Alternatively, articles such as conical or cylindrical golf club shafts, hiking pole shafts or fishing pole sections, plates or foils and the like can also be electroformed of fine-grained metallic materials on a suitable mandrel or temporary substrate to produce strong, ductile, lightweight components exhibiting a high coefficient of restitution and a high stiffness for use in numerous applications including sporting goods.

8 Claims, 4 Drawing Sheets

U.S. PATENT DOCUMENTS

| | | | |
|---|---|---|---|
| 5,320,386 | A | 6/1994 | Harmala et al. |
| 5,352,266 | A | 10/1994 | Erb et al. |
| 5,433,797 | A | 7/1995 | Erb et al. |
| 5,496,463 | A | 3/1996 | Mori et al. |
| 5,538,769 | A | 7/1996 | Sandman, Jr. |
| 5,655,981 | A | 8/1997 | Reed |
| 5,713,800 | A | 2/1998 | Su |
| 5,935,018 | A | 8/1999 | Takeda |
| 5,967,904 | A | 10/1999 | Nagai et al. |
| 6,042,493 | A | 3/2000 | Chauvin et al. |
| 6,106,417 | A | 8/2000 | Umlauft et al. |
| 6,139,444 | A | 10/2000 | Renard et al. |
| 6,334,824 | B1 | 1/2002 | Filice et al. |
| 6,346,052 | B1 | 2/2002 | Chappell |
| 6,354,960 | B1 | 3/2002 | Perryman et al. |
| 6,679,788 | B1 | 1/2004 | Heinrich et al. |
| 7,017,645 | B2 * | 3/2006 | Johnson et al. ............... 164/113 |
| 7,320,832 | B2 | 1/2008 | Palumbo et al. |
| 7,387,578 | B2 | 6/2008 | Palumbo et al. |
| 7,553,553 | B2 | 6/2009 | Palumbo et al. |
| 7,591,745 | B2 | 9/2009 | Palumbo et al. |
| 7,682,943 | B2 * | 3/2010 | Samuelson et al. .......... 438/478 |
| 7,824,774 | B2 * | 11/2010 | Palumbo et al. .............. 428/548 |
| 7,910,224 | B2 * | 3/2011 | Palumbo et al. .............. 428/548 |
| 2001/0051549 | A1 | 12/2001 | Inoue et al. |
| 2002/0061374 | A1 | 5/2002 | O'Brien et al. |
| 2002/0098906 | A1 | 7/2002 | Hsu |
| 2004/0055675 | A1 | 3/2004 | Kuramoto et al. |
| 2004/0092330 | A1 | 5/2004 | Meyer et al. |
| 2004/0121864 | A1 | 6/2004 | Morrow et al. |
| 2004/0147346 | A1 | 7/2004 | Casasanta, Jr. |
| 2004/0244888 | A1 | 12/2004 | Horimura et al. |
| 2004/0256236 | A1 | 12/2004 | Minevski et al. |
| 2005/0103408 | A1 | 5/2005 | Kuehmann et al. |
| 2005/0124433 | A1 | 6/2005 | Scruggs et al. |
| 2006/0037671 | A1 * | 2/2006 | Park .............................. 148/336 |
| 2006/0160636 | A1 | 7/2006 | Palumbo et al. |
| 2006/0193742 | A1 | 8/2006 | Miura et al. |
| 2007/0175550 | A1 * | 8/2007 | Kim et al. .................... 148/561 |

FOREIGN PATENT DOCUMENTS

| | | |
|---|---|---|
| JP | 06292745 | 10/1994 |
| JP | 9-266967 | 10/1997 |
| JP | 9-285568 | 11/1997 |
| JP | 2000061005 | 2/2000 |
| WO | 2004001100 | 12/2003 |
| WO | 2004001102 | 12/2003 |
| WO | 2004092450 | 10/2004 |
| WO | 2004094699 | 11/2004 |

* cited by examiner

FIG. 6a
Conventional,
Columnar Electrodeposit

FIG. 6b
Quasi-Isotropic,
Equiaxed Electrodeposit

STRONG, LIGHTWEIGHT ARTICLE CONTAINING A FINE-GRAINED METALLIC LAYER

CROSS-REFERENCE TO RELATED APPLICATIONS

This is a continuation of U.S. application Ser. No. 12/536,821, filed Aug. 6, 2009 which is a continuation of U.S. application Ser. No. 12/000,582, filed, Dec. 14, 2007, now U.S. Pat. No. 7,591,745 which is a continuation of U.S. application Ser. No. 11/013,456, filed Dec. 17, 2004, now U.S. Pat. No. 7,387,578.

FIELD OF THE INVENTION

This invention relates to the electrodeposition of thick (>30 µm), fine grained coatings (average grain size 4 nm to 10,000 nm) of a pure metal, a metal alloy or metal matrix composite with high resilience (>0.25 MPa) at high deposition rates (>25 µm/hr) to articles for automotive (e.g. running boards, spoiler, muffler tips), and manufacturing applications including tubes or shafts as used e.g. in sporting goods such as ski and hiking poles, fishing rods, golf dub shafts, hockey sticks, bicycle frames, skate blades, snow boards; plates such as golf club head face plates; as well as complex shapes such as sports racquets (tennis, racquetball, squash and the like), golf club heads and the like. Parts are at least partially electroplated with said fine-grained layers of selected metallic materials.

The invention also relates to electroforming such fine-grained metallic materials onto suitable mandrels such as a cylindrical, conical or tapered shaft, or other temporary substrate as well as plates or foils and the like for the production of strong, ductile, lightweight components requiring a high modulus of resilience, a high coefficient of restitution and a high torsional stiffness for use e.g. in sporting goods, as well as the automotive, and industrial applications.

BACKGROUND OF THE INVENTION

In a large number of sporting goods and industrial applications, the article of interest must be strong, wear resistant, lightweight and display high resilience, high flexural stiffness at room temperature as well as elevated temperature (e.g. up 200° C.) while having been manufactured by a convenient and cost-effective method.

Harmala in U.S. Pat. No. 5,320,386 (1994) describes a lightweight, high strength, composite titanium ski pole. The composite shaft includes a hollow first shaft of a titanium alloy and a hollow second shaft of stiffening material. The first and second shafts are assembled to have the exterior surface of one of the shafts in surface-to-surface contact with an interior surface of the other one. By employing the stiffening tube in conjunction with the titanium alloy tube, the titanium alloy tube is still permitted to bend, but is substantially prohibited from bending in an amount which would approach its yield point and result in permanent deformation.

Sandman in U.S. Pat. No. 5,538,769 (1969) describes a graphite composite shaft with a reinforced tip, suitable for use in fishing rods or golf clubs. The shaft includes a base shaft made at least partially of graphite composite material provided in one or more layers or plies. These shafts have relatively slender tips that are normally prone to impact damage.

Fishing rod tip failure/breakage is a major cause of warranty returns of fishing rods to the manufacturer. In addition, as golf clubs are swung in close proximity to the ground, it is not unusual for the club head to strike the ground with considerable force, applying a large force or torque to the narrowest portion of the shaft, i.e. to the tip of the, shaft that is joined to the club head. This impact can cause failure of the composite shaft at this point, causing the tip of the shaft to break at or closely adjacent the club head. The reinforcement layer described in this patent, which extends only part of the way up the length of the base shaft, is intended to render the shaft more resistant to impacts occurring at the tip and increase the durability of the shaft without decreasing the performance of the fishing rod or golf club that incorporates the shaft.

Perryman in U.S. Pat. No. 6,354,960 (2002) describes a golf club shaft with controllable feel and balance using a combination of fiber-reinforced plastics and metal-coated fiber-reinforced plastics to obtain an individually optimized golf club. A filament-wound outer layer having at least one ply including metal-coated fibers covers a sheet-roiled or filament-wound core. The fibers can be metal-coated with metals such as nickel, titanium, platinum, zinc, copper, brass, tungsten, cobalt, gold or silver. The use of metal-coated fibers permits the use of combinations of fiber reinforced plastic and metal-coated fibers in producing golf shafts with optimum performance properties. Specific placement of the metal-coated fibers makes it possible to add weight to predetermined points in the shaft in order to shift the flex and balance points without varying the torsional properties of the shaft and to provide the optimum flex for a given golf club design.

Yanagioka in U.S. Pat. No. 4,188,032 (1980) discloses a nickel-plated golf club shaft made of fiber-reinforced material having on substantially its entire outer surface a metallic plating selected from the group consisting of nickel and nickel based alloys for the purpose of providing a wear-resistant coating. The electroless nickel coating of choice is 20 µm thick and the deposition time is 20 hrs, resulting in a deposition rate of 1 µm/hr.

Kim in U.S. Pat. No. 4,951,953 (1990) describes a golf club electroless coated with a high Young's Modulus material ($\geqq$50 million psi) or with a composite material having a high Young's Modulus material as a substantial ingredient in the matrix. Diamond is particularly preferred as a coating or coating component due to its high strength and relatively low density. The coating may be applied, for example, using an electroless "composite diamond coating" technique, to either the head or shaft of the club, the club head only or the shaft only to provide improved directional accuracy and impact performance characteristics. The coating is typically applied using an electroless "composite diamond coating" technique, to either only the striking face of the club head or, preferably, to a substantial portion of the shaft below the grip and over the club head continuously over the junction between the shaft and club head. The coating thickness ranges from about 1 to 2 mils (25 µM to 50 µm), although 1-10 mil (25 µm to 250 µm) thick coatings are noted and the particle size of the coating material is from about 0.1 µm to 50 µm with a preferred range of 1 µm to 10 µm.

Chappel in U.S. Pat. No. 6,346,052 (2002) discloses golf club irons with multilayer construction. The golf club head comprises a soft nickel alloy core and a hard chrome coating. The process used to produce the golf club heads involves an investment casting process in which the soft nickel alloy core is cast and the hard chrome coating is electroplated onto the core. This multilayer design produces a golf club iron that is durable and consistent from iron to iron with feel characteristics which are generally equal to or better than traditional clubs formed from forged mild carbon steel. Unlike the decorative chrome used on prior art golf clubs (hardness of about 35 to 45 Rockwell C, typical thickness between 0.05 to 0.2 mil) the chrome outer layer used in the invention is between 0.8 mils to about 1 mil (20 μm to 25 μm) thick, which is at least four times thicker than conventional applications of decorative chrome in prior art clubs. The hard chrome plating employed is asserted to provide durability without compromising the superior feel characteristics of the relatively soft nickel alloy core when a golf ball is struck.

Takeda in U.S. Pat. No. 5,935,018 (1999) describes a golf club and method of manufacturing intended to prevent copper or copper alloy material used in the head from corroding. The invention also aims at preventing galvanic corrosion when combining such materials with other materials, such as aluminum alloys, by applying a nickel-plated coating layer to the head, followed by chrome plating.

Umlauft in U.S. Pat. No. 6,106,417 (2000) describes a lightweight tennis racket with a high stiffness. The racket is formed from a composite material including carbon fibers, titanium fibers, and epoxy resin and is at least 27 inches long, weighs less than 9.2 ounces when strung, and has a frequency of vibration of the first mode of bending under free-free constraint of at least 175 Hz. To achieve the lightweight, high strength properties, the carbon-reinforced composite is strengthened particularly in the racket throat area with metallic titanium fibers.

Numerous publications describe sport racquets reinforced and stiffened by structural straps or plates at the outer or inner surfaces, or within the wall of the handle and frame, including Stauffer (U.S. Pat. No. 3,949,988 (1976), Matsuoka in 3P2000061005 (1998) and 3P09285569 (1996).

Reed in U.S. Pat. No. 5,655,981 (1997) describes a shaft for a hockey stick comprising a non-metallic elongated material member; a first layer comprised of a resilient yet tough material bonded to the member; a second layer comprised of metal applied to the first layer by a metal deposition process; and a third layer comprised of a clear, resilient, tough material encasing said second layer of metal. The thin metallic layer is applied to the substrate by a vapor vacuum deposition process. The base layer, metallic layer and top layer have an overall thickness of less than approximately 3 mil. The purpose of the thin metallic layer applied to a non-metallic shaft, having a maximum thickness of 0.01 mil (0.25 μm), is entirely to enhance the appearance and the metals of choice include aluminum, copper, gold and silver.

Burns in U.S. Pat. No. 4,124,208 (1978) discloses a durable, lightweight hockey stick having opposed metal outer skins made of a single piece including the shaft and integral handle and blade portions with a metal honeycomb sandwiched there between. The metal hockey stick provides long life at an overall weight similar to that of wood and is relatively inexpensive.

Erb in U.S. Pat. No. 5,352,266 (1994), and U.S. Pat. No. 5,433,797 (1995) describes a process for producing nanocrystalline materials, particularly nanocrystalline nickel. The nanocrystalline material is electrodeposited onto the cathode in an aqueous acidic electrolytic cell by application of a pulsed DC current. The cell also optionally contains stress relievers. Products of the invention include wear resistant coatings, and magnetic materials.

Palumbo WO2004/001100 A1 (2002) discloses a process for forming coatings or freestanding deposits of nanocrystalline metals, metal alloys or metal matrix composites. The process employs drum plating or selective plating processes involving pulse electrodeposition and optionally a non-stationary anode or cathode. Novel nanocrystalline metal matrix composites are disclosed as well. Also described is a process for forming micro-components with grain sizes below 1,000 nm.

Although a number of electrolytic and electroless plating processes are known to provide metallic coatings to the surfaces of various articles such as golf club heads, shafts and the like, heretofore the electrodeposited metallic coatings used are thin (limited typically to less than 25 μm) and applied primarily for scratch and corrosion resistance.

Electroless coating deposition rates are low, typically 0.25 mil/hr (6.25 μm/hr) to 0.5 mil/hr (12.5 μm/hr) whereas galvanic coating deposition rates typically exceed 1 mil/hr (25 μm/hr). The typical coating thickness values for electroless plating processes are less than 1 mil (25 μm). In the case of electrolytic coatings it is well known that after the coating has been built up to a thickness of about 5-10 μm, it tends to become highly textured and grows in a fashion whereby anisotropic and elongated columnar grains prevail with typical grain widths of a few microns and grain lengths of tens of microns. Prior art thin coatings applied by electroless or conventional electroplating processes exhibit amorphous or conventional grain size values (>5 μm) and do not significantly improve the overall mechanical properties of the coated article.

Substantial grain size reduction has been found to strongly enhance selected physical, chemical and mechanical properties of a coating. For example, in the case of nickel, the ultimate tensile strength increases from 400 MPa (for conventional grain-sizes greater than 5 μm) to 1,000 MPa (grain size of 100 nm) and ultimately to over 2,000 MPa (grain size 10 nm). Similarly, the hardness for nickel increases from 140 VHN (for conventional grain-sizes greater than 5 μm) to 300 VHN (grain size of 100 nm) and ultimately to 600 VHN (grain size 10 nm). We therefore expected that the application of coatings of this kind could improve the durability and performance characteristics of structural components of sporting equipment and other equipment or parts requiring strong, ductile and lightweight components.

OBJECTS AND SUMMARY OF THE INVENTION

It is an objective of the invention to provide articles for use as automotive parts, and industrial components, including sporting goods articles, having a structural metallic layer by applying a thick, coarse-grained or preferably fine-grained metal, metal alloy or metal matrix composite layer of high resilience by electrodeposition to a metallic or non-metallic substrate to enhance the overall strength-to-weight ratio, improve the damping characteristics and/or to provide external or internal surfaces of high resilience, high yield strength, scratch and wear resistance and hardness, and appealing appearance.

It is an objective of the invention to apply an isotropic or quasi-isotropic metallic coating or layer by electrodeposition, minimizing formation of columnar, elongated grains and any undesirable crystallographic texture.

It is an objective of the invention to apply the metallic coating to at least part of the surface of an article made substantially of a polymer material or graphite fiber composite, optionally after rendering the surface conductive e.g. by coating the surface with a thin layer of electroless nickel, copper or the like or by applying chemically reduced silver spray.

It is an objective of this invention to provide a process capable of net-shape electroforming fine-grained metallic articles such as golf club face plates as well as tubes, shafts and complex forms for use in a variety of applications.

It is an objective of this invention to provide shafts or tubes e.g. for use as golf clubs, hockey, ski or hiking pole shafts or fishing poles and tubes for use in bicycle frames, automotive and industrial components and the like that are lightweight, resistant to abrasion, resistant to permanent deformation and do not splinter when cracked or broken.

It is an objective of this invention to at least partially coat the inner or outer surface of parts including complex shapes such as racquets e.g. for tennis, squash, badminton, etc, baseball bats, skis, golf club face plates and/or heads or other sporting equipment, automotive and industrial components with a material that is strong and lightweight.

It is an objective of the invention to provide sporting goods that are strong, wear resistant, lightweight and display high resilience, while being manufactured by a convenient and cost-effective method.

It is an objective of the invention to provide articles with strong, hard, fine-grained layers which can be further hardened by applying a suitable heat treatment after electroplating/electroforming.

It is an objective of the invention to provide a golf club capable of achieving increased flight distance performance, provide increased control over the club shaft and head and/or provide improved golf ball flying distance and accuracy characteristics, as well as improved vibration damping characteristics at low overall weight.

It is an objective of the invention to apply a fine-grained metal, metal alloy or metal matrix composite layer coating using electrodeposition to at least part of the inner or outer surface of an article including a golf club head comprising a substrate selected from:

(i) an undersized cast or forged article (e.g. golf club head made of e.g. plain carbon steel); or
(ii) a plastic preform (e.g. ABS, polycarbonate, e.g. injection molded); or
(iii) metal article inserts (e.g. removable golf club driver faceplates); in order to achieve e.g. in the case of a golf club head
(a) a high resilience face area providing increased driving distance for the golf ball;
(b) damping characteristics providing superior "sound" and "feel" when e.g. striking a golf ball;
(c) high strength-to-weight ratio allowing strategic perimeter weighting of the club head; and
(d) an external surface of high hardness for improved scratch and wear resistance.

With a view to achieving these objectives and improving the properties of commercial articles, in particular sporting equipment, automotive parts, and industrial components, the invention according to one embodiment provides an article with an electrodeposited metal or metal alloy coating having a thickness of between 30 µm and 5 mm and up to as much as 5 cm and a quasi-isotropic microstructure, the coating exhibiting the resilience of at least 0.25 MPa and up to 25 MPa and an an elastic strain limit of at least 0.75% and up to 2.00%. Articles or equipment to which the invention has particular applicability include golf club shafts, including graphite golf club shafts.

According to a further embodiment of the invention, electroformed metallic components are provided for various applications including sporting equipment in which the microstructure of the component is quasi-isotropic and exhibits an average grain size between 0.004 µm and 10 µm and a yield strength of between 200 MPa and 2,750 MPa, for example an electroformed golf club shaft.

Graphite/metal composite articles such as golf shafts incorporating a metallic coating representing at least 5%, preferably more than 10% and even more preferably more than 20% and up to 75%, 85% or 95% of the total weight on a polymer substrate optionally containing graphite/carbon fibers are disclosed. The torsional stiffness per unit weight of the article containing the metallic coating is improved by at least approximately 5% when compared to the torsional stiffness of the same article not containing the metallic coating.

GENERAL DESCRIPTION OF THE INVENTION

The process for producing articles and components of sporting equipment according to the invention comprises the steps of, positioning the metallic or metallized work piece or the reusable mandrel/temporary substrate to be plated in a plating tank containing a suitable electrolyte, providing electrical connections to the mandrel/temporary substrate to be plated and to one or several anodes, forming and electrodepositing a metallic material with an average grain size of less than 1,000 nm on at least part of the surface of the work piece using a suitable D.C. or pulse electrodeposition process described in the copending application, WO 2004/001100 A1 (2002). Patent Publication WO 2004/001100 A1 is incorporated herein by reference for its teaching of electrodeposition techniques which may be used in the preparation of sporting goods articles according to the present invention.

Deposition rates required are at least 25 µm/h, preferably 50 µm/h and more preferably greater than 75 µm/h, by passing single or multiple D.C. cathodic-current pulses between said anode and said work piece area to be plated, i.e. the cathode, at a cathodic-current pulse frequency in a range of approximately 0 to 1,000 Hz, at pulsed intervals during which said current passes for a $t_{on}$-time period of at least 0.1 msec, typically in the range of about 0.1 to 50 msec and does not pass for a $t_{off}$-time period in the range of about 0 to 500 msec, and passing single or multiple D.C. anodic-current pulses between said cathode and said anode at intervals during which said current passes for a $t_{anodic}$-time period in the range of 0 to 50 msec, a cathodic duty cycle being in a range of 5 to 100%. Suitable plating processes include tank, rack, barrel, brush and drum plating.

The novel process can be applied to establish high-strength coatings of pure metals or alloys of metals selected from the group of Ag, Au, Cu, Co, Cr, Ni, Sn, Fe, Pt and Zn and alloying elements selected from Mo, W, B, C, P, S and Si and metal matrix composites of pure metals or alloys with particulate additives such as powders, fibers, nanotubes, flakes, metal powders, metal alloy powders and metal oxide powders of Al, Co, Cu, in, Mg, Ni, Si, Sn, V, and Zn; nitrides of Al, B and Si; C (graphite, diamond, nanotubes, Buckminster Fullerenes); carbides of B, Cr, Bi, Si, W; and self lubricating materials such as $MoS_2$ or organic materials e.g. PTFE. The process can be employed to create high strength, equiaxed coatings on metallic components, or non-conductive components that have been metallized to render them suitable for electroplating. In an alternative embodiment, the same process can be used to electroform a stand-alone article on a mandrel or other suitable substrate and, after reaching the desired plating thickness, to remove the free-standing electroformed article from the temporary substrate.

The following listing describes suitable operating parameter ranges for practicing the invention:

| | |
|---|---|
| Metallic Layer Thickness Minimum: | 30 μm |
| Metallic Layer Thickness Maximum: | 5 mm, up to 5 cm |
| Average Grain Size Range: | 0.004 μm to 10 μm |
| Minimum Ratio Coating Thickness to Grain Size: | 25; 100; 1,000 |
| Maximum Ratio Coating Thickness to Grain Size: | 10,000; 100,000; 1,250,000; 12,500,000 |
| Deposition Rate Range: | 10-500 μm/hr |
| Duty Cycle Range: | 5 to 100% |
| Yield Strength Range: | 200 MPa to 2750 MPa |
| Minimum Modulus of Resilience of the Electrodeposited Layer: | 0.25 MPa, 1 MPa, 2 MPa, 5 MPa, 7 MPa |
| Maximum Modulus of Resilience of the Electrodeposited Layer: | 12 MPa, 25 MPa |
| Elastic Limit Range: | 0.75%-2.00% |
| Particulate Content Range: | 2.5% to 75% by Volume |
| Deposition Temperature Range: | 10 to 100° C. |

In the process of the present invention the electrodeposited metallic coatings optionally contain at least 2.5% by volume particulate, preferably at least 5% and up to 75% by volume particulate. The particulate can be selected from the group of metal powders, metal alloy powders and metal oxide powders of Al, Co, Cu, In, Mg, Ni, Si, Sn, V, and Zn; nitrides of Al, B and Si; C (graphite or diamond); carbides of B, Cr, Si, W; $MoS_2$; and organic materials such as PTFE and other polymeric materials. The particulate average particle size is typically below 10,000 nm (10 μm), 5,000 nm (5 μm), 1,000 nm (1 μm), and more preferably below 500 nm.

The present invention provides for electrodeposited fine-grained layers, having a thickness of at least 0.030 mm, more preferably more than 0.05 mm and even more preferably more that 0.1 mm on the surface of appropriate articles, including golf club heads, inserts for golf club heads, face plates for golf clubs; shafts for golf clubs, hockey sticks, hiking and skiing poles, etc, and coatings to complex shapes e.g. baseball bats, skate blades, snow boards and tennis rackets.

The electrodeposited metallic fine-grained layers of this invention have an average grain size under 10 μm (10,000 nm), preferably in the range of 4 to 750 nm, more preferably between 10 and 500 nm and even more preferably between 15 nm and 300 nm.

The electrodeposited fine-grained layers of this invention have a modulus of resilience of at least 0.25 MPa, preferably at least 1 MPa, more preferably at least 2 MPa, more preferably at least 5 MPa and even more preferably at least 7 MPa and up to 25 MPa.

The electrodeposited fine-grained layers of this invention have an elastic limit of at least about 0.75%, and preferably greater than about 1.0%; and preferably greater than 1.5% and up to 2.00%.

In a preferred embodiment, the present invention provides an equlaxed microstructure throughout the plated component, which is relatively independent of component thickness, shape and part orientation in the plating cell.

To ensure part reliability, it is preferable to maintain the average thickness to average grain size ratio of the coated layer at a minimum value of 25, preferably greater than 500, and more preferably greater than 1,000; and up to 1,250,000 and as much as 12,500,000.

In a preferred embodiment of the process of this invention, dispersion strengthening of metallic coatings is performed by a subsequent heat-treatment.

According to this invention, patches or sections can be formed on selected areas (e.g. golf club face plates or sections of golf club shafts, bats, racquets, frames for bicycles and the like), without the need to coat the entire article.

According to this invention patches or sleeves which are not necessarily uniform in thickness can be electrodeposited in order to e.g. enable a thicker coating on selected sections or sections particularly prone to heavy use such as golf club face plates, the tip end of fishing poles and shafts for golf clubs, skiing or hiking poles etc.

BRIEF DESCRIPTION OF THE DRAWINGS

In order to better illustrate the invention by way of examples, descriptions are provided for suitable embodiments of the method/process/apparatus according to the invention in which:

FIG. 6 schematically depicts the microstructural features differentiating columnar (6a) from quasi-isotropic/equiaxed (6b) grain structures. "Columnar" in this context refers to a grain shape or structure, which typically starts with one size upon initiation of the plating on the substrate. With increased layer thickness and plating time the grains become progressively larger and align with a certain crystallographic orientation relative to the substrate. The local average grain size distribution of columnar grain structures changes and progressively increases from the substrate to the outer surface, "Quasi-isotropic/equiaxed" in this context refers to grains that exhibit some crystallographic texture but are reasonably uniform in shape and size, exhibiting a grain size distribution which is similar throughout the deposit.

The present invention is intended for depositing preferably fine-grained quasi-isotropic layers onto articles in the form of external or internal coatings or electroforming articles comprising a metal or alloy selected from Cu, Co, Cr, Ni, Fe, Sn, Mo and Zn optionally with particulate dispersed in the fine-grained layer.

DETAILED DESCRIPTION OF PREFERRED EMBODIMENT

This invention relies on producing fine-grained, quasi-isotropic, equiaxed coatings by DC or pulse electrodeposition.

The person skilled in the art of plating, in conjunction e.g. with U.S. Pat. No. 5,352,266 (1994), U.S. Pat. No. 5,433,797 (1995) and in PCT/EP02/07023 (2002) cited already, will know how to electrodeposit selected metals or alloys by selecting suitable plating bath formulations and plating conditions. These patents are incorporated herein by reference for their disclosure of electrodeposition methods. Optionally, solid particles can be suspended in the electrolyte and are included in the deposit as described in PCT/EP02/07023, filed on Jun. 25, 2002.

Minimizing the thickness and weight of articles for numerous applications can be achieved by increasing the strength through grain size reduction. Depending on the ductility required, the grain size of e.g. Ni-based coatings in the range of 4 nm to 10,000 nm, preferably 10 nm to 500 nm provides a coating with suitable mechanical properties. Incorporating a sufficient volume fraction of particulate can be used to further enhance the material properties.

Depending on the requirements of the particular application, the material properties can also be altered e.g. by incorporating dry lubricants (such as $MoS_2$ and PTFE), abrasion or wear resistant particles. Generally, the particulates can be selected from the group of metal powders, metal alloy powders and metal oxide powders of Al, Co, Cu, In, Mg, Ni, Si, Sn and Zn; nitrides of Al, B and Si; C (graphite, diamond, nanotubes, and/or Buckminster Fullerenes); carbides of B, Si, W; self lubricating materials such as $MoS_2$, organic materials such as PTFE and polymeric materials.

As noted above, particularly suited applications of the fine-grained layers disclosed herein include golf shafts, ski poles, fishing rods, hockey sticks, tennis racquets, bicycle frames and other articles and structures comprised of conventional metal, polymer or graphite composites that are coated on at least part of the interior and/or exterior surfaces, or, alternatively are net-shape electroformed with the use of a temporary substrate. Conventional metals e.g. aluminum, titanium, steel and their alloys are relatively soft, permanently deform and break easily as a result of the bending and torsional loads encountered during use. Furthermore, these conventional materials generally exhibit a low resistance to abrasion and cut or scratch easily and can benefit from the fine-grained metallic layer described in this invention. Shafts made from composites of synthetic resins and filaments are more resilient under bending forces than aluminum, but lack sufficient strength. This deficiency, however, can be overcome by applying a fine-grained metallic layer according to the present invention.

The rebound distance of an object, e.g. a golf ball, tennis ball, baseball or the like when it impacts a certain material is a function of the modulus of resilience, $U_r$, of the material, which is expressed as:

$$U_r = \frac{1}{2}\sigma_y\varepsilon_y = \frac{\sigma_y^2}{2E}$$

(Metals Handbook, Ninth Edition, Volume B, Mechanical Testing, American Society for Metals, Materials Park, Ohio, 44073)

Where $\varepsilon_y$ is the maximum true strain at the yield point, $\sigma_y$, represents the yield strength and E the modulus of elasticity. As fine-grained materials described in this invention possess yield strength values, $\sigma_y$, which are three to five and up to ten times greater that those of conventional coarse-grained metals, the resilience (rebound distance capacity) can therefore be increased nine to twenty five-fold and up to hundred fold. The modulus of elasticity E, however, is typically not affected by reducing the grain size of a given metallic material, provided the material is fully dense. The modulus of elasticity, however, can be altered e.g. by using metal matrix composites.

Material properties required for a number of applications also include a high elastic strain-to-failure limit. Low damping characteristics (low absorption and high re-release of energy) ensures that even after high load and stress deformation the material springs back to its original shape as required on strike faces for e.g. golf head face plates and baseball bats. Conventional metals have elastic strain limits of 0.65% or less. The current invention is directed to metallic materials having elastic limits of at least about 0.75%, preferably greater than about 1.0%; and preferably greater than 1.5% and up to 2.00%.

Figure 1:
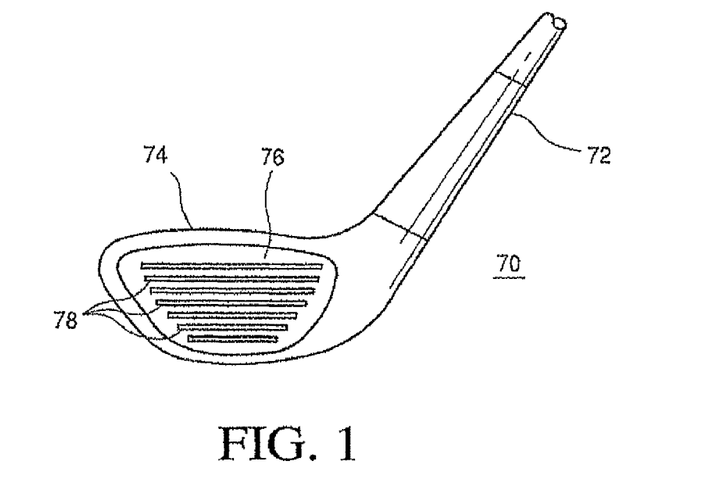
FIG. 1 is a frontal view of a golf club head utilizing a clubface plate coated with the ultra-fine grained metallic material as the ball-contacting surface.

FIG. 1 illustrates a frontal view of a golf club 70 having a shaft 72 and a head 74 attached at one end of the shaft 72. A faceplate 76 of the head 74 includes a plurality of grooves 78. The faceplate 76 contains a layer of the fine-grained material of high strength and resilience and a low coefficient of friction. In one embodiment, the entire head 74 is coated with the fine-grained material. In an alternate embodiment the faceplate 76 contains or is coated with the fine-grained material. The fine-grained material optionally contains solid particles dispersed throughout the layer including ceramic particulate (e.g. $TiO_2$, WC, $B_4C$) to improve hardness, wear resistance and yield strength and/or a lubricating material (e.g. $MoS_2$, PTFE, and other fluoropolymers).

Carbon fiber composites possess much higher specific rigidity and lower density than steel; however, the lightweight, carbon-fiber golf shafts often exhibit undesirable twisting of the club head relative to the shaft on down-swing and particularly at ball contact, resulting in poor accuracy and flying distance. This limitation can be overcome by coating at least 10% of the composite shaft's external and/or internal surface with the fine-grained metallic layer described.

Figure 2:
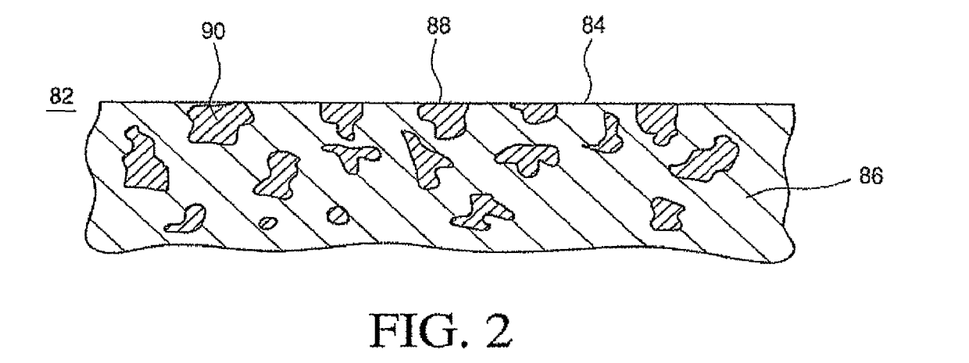
FIG. 2 is a cross-sectional view of the electrodeposited layer applied e.g. to golf club ball-striking surfaces, shafts of poles for golf clubs, ski poles and hiking poles, in accordance with one embodiment of this invention.

FIG. 2 illustrates a cross-sectional view of the fine-grained electrodeposited layer containing solid particles, applied to an article e.g. to golf club ball-striking surfaces, shafts of poles for golf clubs, ski poles and hiking poles 82 in accordance with the present invention. The layer with the outer surface 84 includes a metallic matrix material 86, as well as the surface 88 of a particulate (lubricant, high strength, low wear rate, and/or appealing appearance) material 90. The particulate material 90 has been distributed throughout the matrix material 86.

Figures 3, 4:
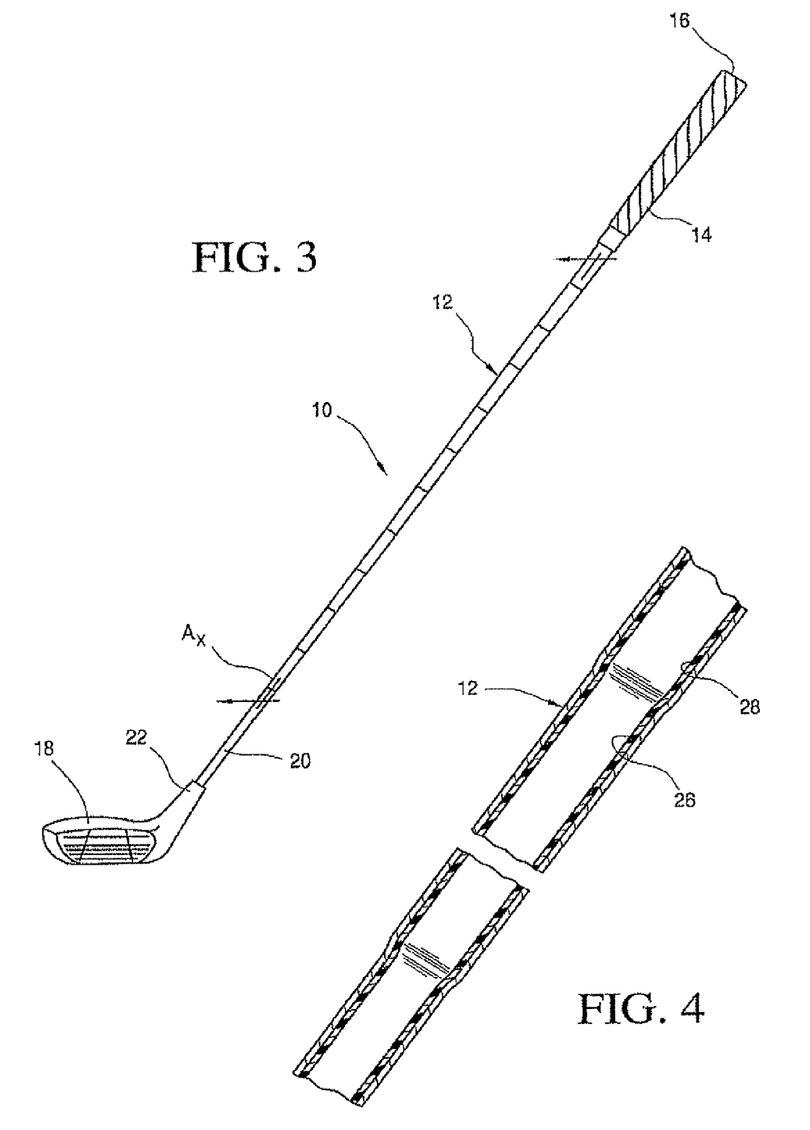
FIG. 3 is a perspective view of a golf club including a golf club shaft having a fine-grained outer layer in accordance with the teachings of the present invention.
FIG. 4 is a partial perspective cross-sectional view of the shaft of FIG. 3 including a fine-grained layer deposited along a selected length of the shaft's outer surface.

A golf club incorporating any one of a number of different shafts in accordance with the teachings of the present invention is shown in FIG. 3 and is designated generally by the reference numeral 10. As shown, the golf club 10 includes a generally conical shaft 12 formed along the longitudinal axis $A_x$ with a grip 14 attached at its upper end 16 and a club head 18 attached at its lower end 20. The shaft 12 is typically tapered downward from the upper end 16 to the lower end 20, with the lower end 20 of the shaft 12 being received within a hosel 22 of the golf club head 18 as is conventional in the art. The shaft 12 includes a fine-grained layer that covers at least part of the selected length dimension along the shaft 12. As will be described in greater detail below, this fine-grained metallic layer can be applied as a coating to at least part of the metal or composite shaft or, in an alternative embodiment, can be electroformed to yield the shaft 12.

As shown particularly in FIG. 4, the shaft 12 is fabricated by applying a fine-grained coating 28 to the metallic (e.g. steel) or polymer composite (carbon fiber/epoxy) shaft 26 on its outer surface. The grain structure of the deposit is quasi-isotropic and equiaxed as displayed in FIG. 6b.

It should be noted that the shaft or part 12 providing the substrate for the fine-grained quasi-isotropic metal or metal composite layer coating of the present invention can be formed from a variety of different materials and multiple layers thereof. By way of example, parts can be made from both metallic and non-metallic materials and combinations of both metallic and non-metallic materials. Metals considered suitable for the production of components, e.g. golf club shafts include aluminum, titanium, steel, stainless steel, copper, brass, bronze, zinc, magnesium, tin and nickel, or their alloys.

Various non-metallic materials, which are now commonly used in the manufacture of golf club shafts or other sporting goods parts as well as various automotive, or industrial articles, include polymeric resin matrix composites employing materials including carbon fibers, ceramic matrix, aramid fibers, polyethylene fibers, boron, fiberglass, and various thermoplastics including, but not limited to, polypropylene, polyethylene, polystyrene, vinyls, acrylics, nylon and polycarbonates, among others.

The present invention is particularly suitable for graphite-containing articles including golf club shafts or other sporting goods. As all articles can be rendered suitable for electroplating by applying a thin layer of a conductive material e.g. by electroless deposition, physical or chemical vapor deposition, or applying electrically conductive paints by chemical vapor deposition, or applying electrically conductive paints by various suitable means, it should be clear to those skilled in the art that the subject invention encompasses the use of virtually any substrate material.

According to a further preferred embodiment of the present invention, it is also possible to produce fine-grained coatings by electroplating without the need to enclose the area of the article to be coated and form a plating bath around it. Brush or tampon plating is a suitable alternative, particularly when only a small portion of the work-piece is to be plated. The brush plating apparatus typically employs a dimensionally stable or soluble anode wrapped in an absorbent separator felt to form the anode brush. The brush is rubbed against the surface to be plated in a manual or mechanized mode and electrolyte solution containing ions of the metal or metal alloys to be plated is injected into the separator felt.

EXAMPLE 1

Electroformed Article—Shaft, Ni—Mo

A freestanding golf club shaft comprised entirely of fine-grained, nanocrystalline Ni—Mo (Mo content≦2%) was electroformed on a Cr-plated steel mandrel ($OD_1$=0.600", tapering down to $OD_2$=0.335" over a length of 42") in a modified Watts nickel bath and using a Dynatronix (www.dynatronix.com, Dynanet PDPR 40-100-400) pulse power supply. The electrolyte used comprised 300 g/l nickel sulfate, 45 g/l nickel chloride, 45 g/l boric acid, 4 g/l sodium molybdate, 2 g/l saccharin and 5 ml/l NPA-91 (www.atotechUSA.com supplied wetting agent). Standard levelers, brighteners, stress relievers and chelating agents were employed and nickel "R"-rounds (www.inco.com) were used as anode material. The electroplating conditions and metallic layer properties used are summarized in Table 1.1.

TABLE 1.1

| Electroplating Conditions | |
|---|---|
| Deposition Temperature [° C.] | 62 |
| Duty Cycle [%] | 30 |
| Deposition Rate [μm/hr] | 75 |
| Average Coating Thickness: [μm] | 325 |
| Average Grain Size: [μm] | 0.035 |
| Ratio Coating Thickness/Grain Size | 9,286 |
| Yield Strength [MPa] | 1035 |
| Hardness [VHN] | 540 |

The electroformed nano Ni/Mo shaft was removed from the temporary substrate. Due to the partial shielding of the anodes, the shaft wall thickness increased from 300 micron at the handle ($OD_1$) to 380 micron at the tip ($OD_2$). This particular shaft, a graphite shaft and a steel shaft of similar weight were equipped with Pro Steel #4 Iron heads and submitted to Golf Laboratory Inc. (www.golflabs.com) for computer controlled robotic performance testing. Six individual measurements were taken for each test condition. Table 1.2. illustrates that the average ball dispersion and distance (higher lift angle, higher ball velocity and reduced ball spin rate) characteristics of the electroformed shaft are improved when compared to both graphite and steel shafts.

Particularly noteworthy is the substantial improvement in ball dispersion for "off center hits".

Figure 6A:
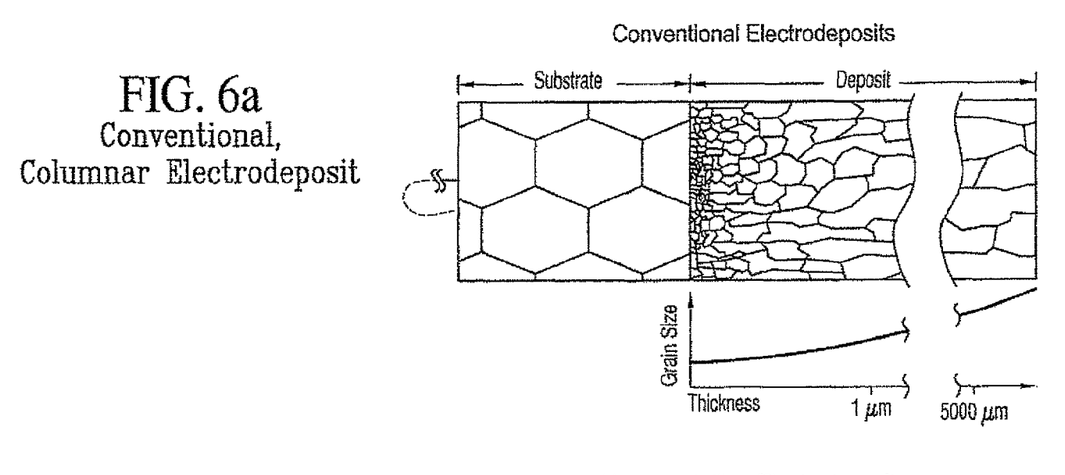
Figure 6B:
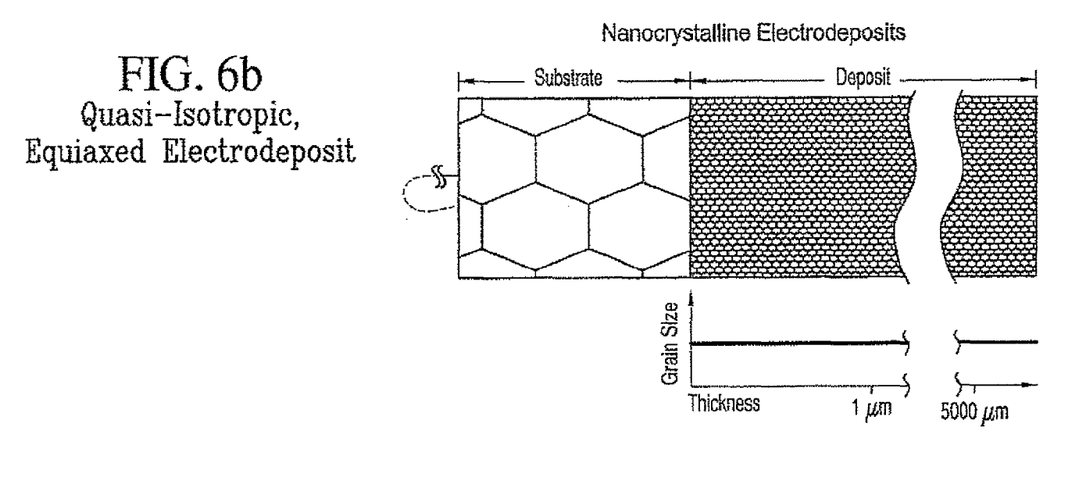

One sample was cross sectioned. The microstructure of the plated layer was confirmed to be quasi-isotropic as illustrated in FIG. 6b.

Other parts composed of nickel, cobalt or iron based alloys with different geometries including tubes, plates and the like were also successfully formed using the same process.

TABLE 1.2

| | Golf Club Robotic Test Results Shaft Description | | | | | | | | |
|---|---|---|---|---|---|---|---|---|---|
| | GRAPHITE, UST ProForce 95 'S' Flex | STEEL-STD, 'S' Flex | This Invention | GRAPHITE, UST ProForce 95 'S' Flex | STEEL-STD, 'S' Flex | This Invention | GRAPHITE, UST ProForce 95 'S' Flex | STEEL-STD, 'S' Flex | This Invention |
| | Center Hits | | | ½" Toe Hits | | | ½" Heel Hits | | |
| Carry Distance [m] | 161.7 | 164.6 | 164.9 | 158.4 | 158.8 | 161.7 | 163.2 | 165.7 | 166.0 |
| Carry Dispersion [m] | 1.16 | 0.94 | 1.25 | 5.54 | 3.29 | 1.71 | 4.63 | 6.00 | 1.71 |
| Total Distance [m] | 168.2 | 169.8 | 176.8 | 164.3 | 165.5 | 168.1 | 170.4 | 172.4 | 173.6 |

TABLE 1.2-continued

Golf Club Robotic Test Results
Shaft Description

| | GRAPHITE, UST ProForce 95 'S' Flex | STEEL- STD, 'S' Flex | This Invention | GRAPHITE, UST ProForce 95 'S' Flex | STEEL- STD, 'S' Flex | This Invention | GRAPHITE, UST ProForce 95 'S' Flex | STEEL- STD, 'S' Flex | This Invention |
|---|---|---|---|---|---|---|---|---|---|
| | | Center Hits | | | ½" Toe Hits | | | ½" Heel Hits | |
| Total Dispersion [m] | 1.74 | 1.37 | 1.62 | 5.94 | 3.51 | 2.07 | 4.51 | 6.80 | 2.16 |
| Ball Velocity [km/h] | 139.4 | 139.7 | 140.8 | 134.3 | 134.7 | 135.7 | 138.0 | 138.5 | 138.6 |
| Head Velocity [km/h] | 144.0 | 144.8 | 146.1 | 144.4 | 145.3 | 146.1 | 144.8 | 146.0 | 146.6 |
| Spin [rpm] | 5456 | 5412 | 5301 | 5390 | 5500 | 5526 | 5097 | 5180 | 5308 |
| Lift Angle [°] | 18.8 | 19.5 | 20.1 | 18.7 | 19.3 | 19.7 | 18.7 | 18.5 | 19.9 |
| Lift Height [m] | 38.8 | 40.5 | 41.9 | 35.7 | 37.1 | 38.6 | 37.2 | 39.2 | 40.2 |

EXAMPLE 2 n-Ni Coated Graphite Composite

Penley Graphite Light LS S-Flex and Penley G2-85 X-Flex graphite shafts were used. The S-Flex shafts were characterized, stripped of the paint and subsequently plated with coarse and fine-grained coatings. Plated S-Flex shafts and unplated X Flex shafts having a total overall weight of 89 g were performance tested. The Ni sleeves were applied to the outside of the S-Flex graphite golf club shafts ($OD_1$=0.586, tapering down to $OD_2$=0.368" over a length of 40.5") by electrodeposition in a modified Watts nickel bath and using a Dynatronix (Dynanet PDPR 20-30-100) pulse power supply. The starting mass of each S-Flex shaft was 71.5 g and prior to electroplating approximately 6.0 g of paint was stripped off. The coating procedure comprised three steps, namely (1) a thin electroless nickel plating to enhance the electrical conductivity using a procedure and chemicals provided by Mac-Dermid Industrial Products (www.macindustrialproducts.com) to achieve an average metal film thickness of 0.4 micron at a deposition rate of 1.7 μm/hr and (2) electroplating to form the fine-grained or coarse-grained coating by varying the duty cycle and the peak current density. The electrolyte composition was 300 g/l nickel sulfate, 45 g/l nickel chloride, 45 g/l boric acid ($H_3BO_3$), 2 g/l saccharin and 3 ml/l NPA-91. Standard levelers and brighteners were employed and Inco nickel "R"-rounds were used as anode material. The weight of the metal coating was approximately 20 g. The electroplating conditions and metallic layer, properties used are summarized in Table 2.1.

TABLE 2.1

Electroplating Conditions

| | Fine Grained | Coarse Grained |
|---|---|---|
| Deposition Temperature [° C.] | 60 | 60 |
| Duty Cycle [%] | 25 | 100 |
| Deposition Rate [μm/hr] | 50 | 8.6 |
| Average Coating Thickness: [μm] | 55 | 58 |
| Average Grain Size: [μm] | 0.025 | 10 |
| Ratio Coating Thickness/Grain Size | 2,200 | 5.8 |

TABLE 2.1-continued

Electroplating Conditions

| | Fine Grained | Coarse Grained |
|---|---|---|
| Yield Strength [MPa] | 900 | 276 |
| Hardness [VHN] | 580 | 140 |

Flexural stiffness was measured with a GolfSmith Frequency Analyzer and the frequency was converted to a FlexRating (S=stiff, X=extra stiff). The torque values were determined using a GolfSmith Torque Arm with 1 ft.lb torque 2" from the tip end of the shaft. The data are summarized in Table 2.2 and indicate that a significant improvement in the torque values can be obtained by replacing some fraction of the original weight of a graphite shaft with an electrodeposited coating, while maintaining the overall total weight.

Professional golfers also tested these golf clubs. The feedback received suggested that the clubs made according to this invention exhibited a superior feel when compared to conventional graphite or steel shafts. Furthermore, the fine-grained coated graphite shafts performed unlike either conventional graphite or steel shafts. Compared to graphite, the ball trajectory was reported to more consistent, as expected from the significantly improved torque value measurements.

TABLE 2.2

Comparison of Golf Shaft Properties

| Shaft ID | Standard Graphite Shaft | Fine Grained | Coarse Grained |
|---|---|---|---|
| Graphite Shaft Weight Before Coating [g] | 88.5 | 71.6 | 71.8 |
| Deflection Before Coating | X | S | S |
| Torque Before Coating [°] | 4.4 | 5.4 | 5.1 |
| Plating weight [g] | N/A | 19.2 | 20.0 |
| Total weight [g] | 88.5 | 88.8 | 89.8 |
| Deflection After Coating | X | X | X |
| Torque After Coating [°] | 4.4 | 3.6 | 4.0 |

One sample was cross sectioned. The microstructure of the plated layer was confirmed to be quasi-isotropic as illustrated in FIG. 6b.

Similar performance benefits were achieved when the coated articles were fishing rods, hockey sticks, baseball bats, tennis racquets, bicycle frames and the like as well as automotive, and other industrial components.

EXAMPLE 3 n-Ni Coated Graphite Composite

Figure 5:
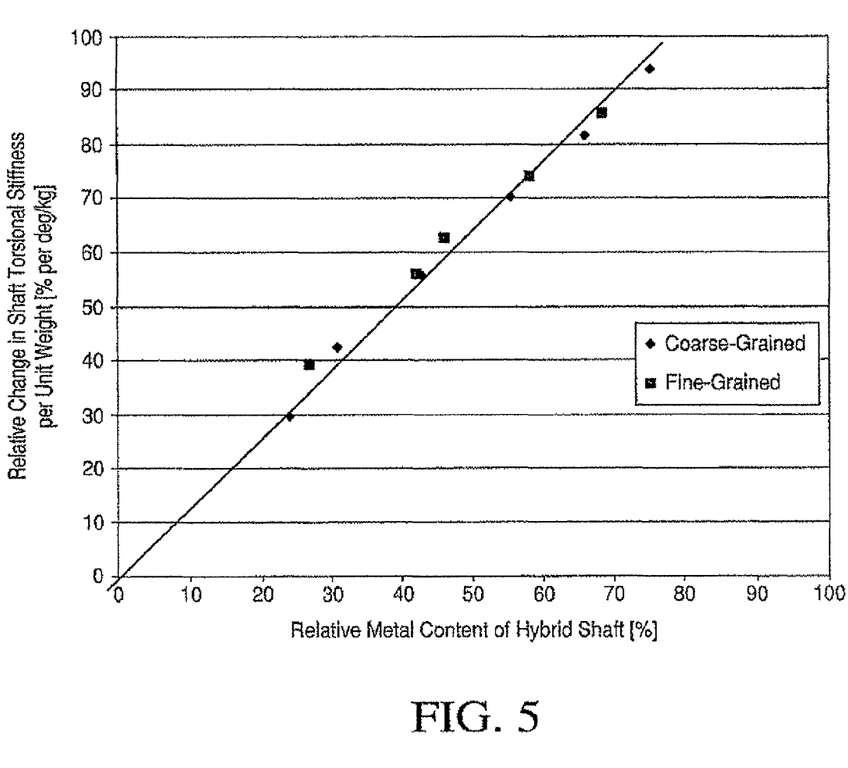
FIG. 5 shows the torsional stiffness as a function of the metal content of graphite/metal composite golf shafts containing a coarse grained or fine-grained layer deposited along a selected length of the shafts' outer surface.

Example 2 illustrates the benefit of relatively thin, fine-grained metallic coatings with a thickness of >25 μm. To investigate the effect of further increasing metal content, hybrid graphite/metal golf shafts were prepared and characterized. True Temper Prolaunch (A-Flex) driver graphite shafts were coated with fine-grained and coarse-grained electrodeposited metallic nickel layers of varying weights. The process and the characterization techniques employed are described in example 2. FIG. 5 shows the torsional stiffness as a function of the metal content of graphite/metal composite golf shafts. The data reveal that the torsional stiffness per unit weight of the article containing a metallic coating representing 5% of the total weight is improved by at least about 5% when compared to the torsional stiffness of the same article not containing the metallic coating. Further improvements in the torsional stiffness are obtained when the relative metal content of the hybrid shaft is further increased at a rate of approximately one percent improvement in torsional stiffness per percent relative metal content, The torque and deflection data indicate that a significant performance improvement can be obtained by increasing the relative metal weight of the composite graphite/metal shafts. Graphite/metal composite golf shafts incorporating a metallic coating representing at least 5%, preferably more than 10% and even more preferably more than 20% of the total weight provide a substantial improvement over the performance of uncoated graphite shafts.

Similar performance benefits were achieved when the coated articles were fishing rods, hockey sticks, baseball bats, tennis racquets, bicycle frames and the like as well as automotive, and other industrial parts,

EXAMPLE 4

Faceplate

A 1 mm thick mild steel faceplate as used in golf club drivers illustrated in FIG. 1 was plated using a conventional tank electroplating cell setup and employing the Watts bath as described in Example 2 in order to deposit a 0.4 mm thick layer of fine-grained nickel on one surface. The nickel-layer surface was polished to a "mirror finish" ultimately using 1 μm diamond paste. Subsequently a 0.4 mm thick layer of conventional coarse-grained nickel was prepared as described in Example 2. The two samples were suitably mounted on a horizontal plate and a steel ball (3 mm diameter) was dropped from a height of 60 cm onto the samples. The rebound height was determined to be 2.9 mm for the conventional nickel layer, while the rebound height of the fine-grained nickel sample was determined to be 28.8 mm. The rebound height of the fine-grained Ni-sample improved by a factor of approximately 10, as expected based on the 10 fold improvement in resilience (Table 4.1).

A conventionally plated sample and one fine-grained sample were cross sectioned. The microstructure of the conventionally plated layer was confirmed to be columnar as illustrated in FIG. 6a, whereas the microstructure of the fine-grained layer was quasi-isotropic as illustrated in FIG. 6b.

TABLE 4.1

Electroplating Conditions

|  | This Invention (fine grained) | Prior Art (coarse grained) |
|---|---|---|
| Average Coating Thickness: [micron] | 400 | 400 |
| Average Grain Size: [μm] | 0.025 | 20 |
| Grain Size Profile through Thickness | Equiaxed | Variable, columnar grains |
| Ratio Coating Thickness/Grain Size | 16,000 | 20 |
| Deposition Rate [μm/hr] | 45 | 18 |
| Duty Cycle [%] | 25 | 100 |
| Deposition Temperature [° C.] | 60 | 60 |
| Yield Strength [MPa] | 900 | 276 |
| Resilience, MPa | 1.93 | 0.18 |
| Rebound height [cm] | 28.8 | 2.9 |
| Improvement in Rebound Height [%] | 893 | 0 |

EXAMPLE 5

Generic Property Comparison

Conventional plate materials were sourced, including an alloy of 17% Cr, 4% Ni, balance being Fe and 6% Al, 4% V, balance being Ti. Ni coatings prepared from a conventional Watts baths were included. Using the plating conditions described in Example 2 and adding and maintaining $FeCl_2.H_2O$ (12 g/l), $FeSO_4.7H_2O$ (81 g/l) and the Na-Citrate (9 g/l) to the Watts bath electrolyte, fine-grained Ni-20% Fe alloy layer coatings were produced. A number of mechanical properties are listed in table 5.1 and depict the advantages of the fine-grained materials according to this invention.

A conventionally plated sample and one fine-grained sample were cross sectioned. The microstructure of the conventionally plated layer was confirmed to be columnar as illustrated in FIG. 6a, whereas the microstructure of the fine-grained layer was quasi-isotropic as illustrated in FIG. 6b.

TABLE 5.1

Mechanical Properties of Plate Materials

|  | Fe—17Cr—4Ni (Aged) | Ti—6Al—4V (Annealed) | Conventional Watts-Ni | Ni—20Fe/ Fine Grained |
|---|---|---|---|---|
| Grain Size [μm] | 50-150 | 50-150 | 5-50 | 0.015 |
| Ultimate Tensile Strength, [MPa] | 1,365 | 895 | 400 | 2,250 |
| Yield Strength, [MPa] | 1260 | 830 | 276 | 1,785 |
| Density, [kg/m³] | 7,806 | 4,429 | 8,902 | 8,318 |
| Modulus, [GPa] | 197 | 110 | 210 | 185 |
| Strength to Density, [km] | 17 | 20 | 4.5 | 27 |
| Resilience, [MPa] | 4 | 3 | 0.18 | 9 |

EXAMPLE 6

Faceplate Coating

A nanocrystalline Co—$TiO_2$ nanocomposite of 0.12 mm average coating thickness was deposited onto a number of golf head faceplates as in example 5 using a modified Watts bath for cobalt using a soluble anode made of electrolytic cobalt pieces and a Dynatronix (Dynanet PDPR 20-30-100) pulse power supply. The electrolyte used comprised 300 g/l cobalt sulfate, 45 g/l cobalt chloride, 45 g/l boric acid, 2. g/l saccharin and 4 ml/l NPA-91. Suspended in the bath were 0-500 g/l titania particles (<1 μm particle size) with the aid of 0-12 g/l Niklad™ particle dispersant (MacDermid Inc.). The electroplating conditions and metallic layer properties used are summarized in Table 6.1.

In order to achieve a fine-grained coating such as indicated in FIG. 2 a series of coated samples was produced using the modified Watts bath with the addition of $TiO_2$ particles (particle size<1 μm) ranging from 50 g/l to 500 g/l. Table 6.2 illustrates the properties of the deposits.

TABLE 6.1

| Electroplating Conditions | |
| --- | --- |
| Deposition Temperature [° C.] | 60 |
| Duty Cycle [%] | 25 |
| Deposition Rate [μm/hr] | 40 |
| Average Coating Thickness: [μm] | 120 |
| Average Grain Size: [μm] | 0.015 |
| Ratio Coating Thickness/Grain Size | 8,000 |

TABLE 6.2

Co—$TiO_2$ nanocomposite properties

| Sample | Bath Concentration $TiO_2$ [g/l] | Bath Concentration Dispersant [g/l] | Grain Size of Co deposit [nm] | $TiO_2$ Fraction in Deposit [Volume %] | Micro-hardness [VHN] |
| --- | --- | --- | --- | --- | --- |
| Control | 0 | 0 | 16 | 0 | 490 |
| 1 | 50 | 0 | 15 | 19 | 507 |
| 2 | 100 | 1.5 | 15 | 23 | 521 |
| 3 | 200 | 3 | 17 | 32 | 531 |
| 4 | 300 | 6 | 17 | 38 | 534 |
| 5 | 500 | 12 | 16 | 37 | 541 |

EXAMPLE 7

Faceplate Coating

A faceplate of a mild-steel golf club head as illustrated in FIG. 1 was coated using a selective plating unit supplied by Sifco Selective Plating (www.brushplating.com). A DC Power supply was employed. Standard substrate cleaning and activation procedures provided by Sifco Selective Plating were used. Using the anode brush with manual operation a 50 μm thick nanocrystalline Ni~0.6 wt % P (average grain size: 13 nm, 780 VHN) layer was deposited onto the face plate area of about 3 in². The electrolyte used comprised 137 g/l nickel sulfate, 36 g/l nickel carbonate, 4 g/l phosphorous acid and 2 g/l saccharin. Inco nickel "R"-rounds were used as anode material. The electroplating conditions and metallic layer properties used are summarized in Table 7.1. After plating the faceplate was heat-treated as indicated to further enhance the mechanical properties by precipitation hardening.

One sample was cross sectioned. The microstructure of the plated layer was confirmed to be quasi-isotropic as illustrated in FIG. 6b.

TABLE 7.1

| Electroplating Conditions | |
| --- | --- |
| Deposition Temperature [° C.] | 65 |
| Duty Cycle [%] | 100 |
| Deposition Rate [μm/hr] | 50 |
| Average Coating Thickness: [μm] | 50 |
| Average Grain Size: [μm] | 0.013 |
| Ratio Coating Thickness/Grain Size | 3,846 |
| Hardness [VHN] | 780 |
| Hardness after Heat Treatment (400° C./20 min) [VHN] | 890 |
| Hardness after Heat Treatment (400° C./20 min + 200° C./11 hrs) [VHN] | 1010 |

The invention claimed is:

1. An article having at least one layer selected from the group consisting of metal, metal alloy and metal matrix composite on a metallic or non-metallic substrate, said layer having:
   (i) a microstructure with an average grain size between 0.004 μm and 10 μm;
   (ii) a modulus of resilience in the range of 0.25 MPa and 25 MPa; and
   (iii) an elastic limit in the range of 0.75% and 2.00%.

2. A article according to claim 1, wherein the ratio of layer thickness to average grain size is at least 25.

3. A article according to claim 1, wherein said layer is a pure metal selected from the group consisting of Ag, Au, Cu, Co, Cr, Ni, Sn, Fe, Pt and Zn; an alloy of two or more of these metals, or an alloy of at least one of these metals and a component selected from the group consisting of Mo, W, C, P, S and Si.

4. The article of claim 1 wherein the substrate is a polymer substrate.

5. The article of claim 4 wherein said polymer substrate contains additives selected from the group consisting of graphite fibers, carbon fibers, aramid fibers and fiberglass.

6. The article of claim 4 wherein said layer has a weight amounting to 5 to 95% of the weight of the article.

7. The article of claim 1 containing conductive material between the substrate and the layer.

8. The article of claim 1 wherein said layer extends over at least part of an inner surface, an outer surface or both an inner and outer surface of said substrate.

* * * * *